July 12, 1938. E. C. EKSTROMER 2,123,184
DRIVING MECHANISM
Filed May 11, 1937 3 Sheets-Sheet 2
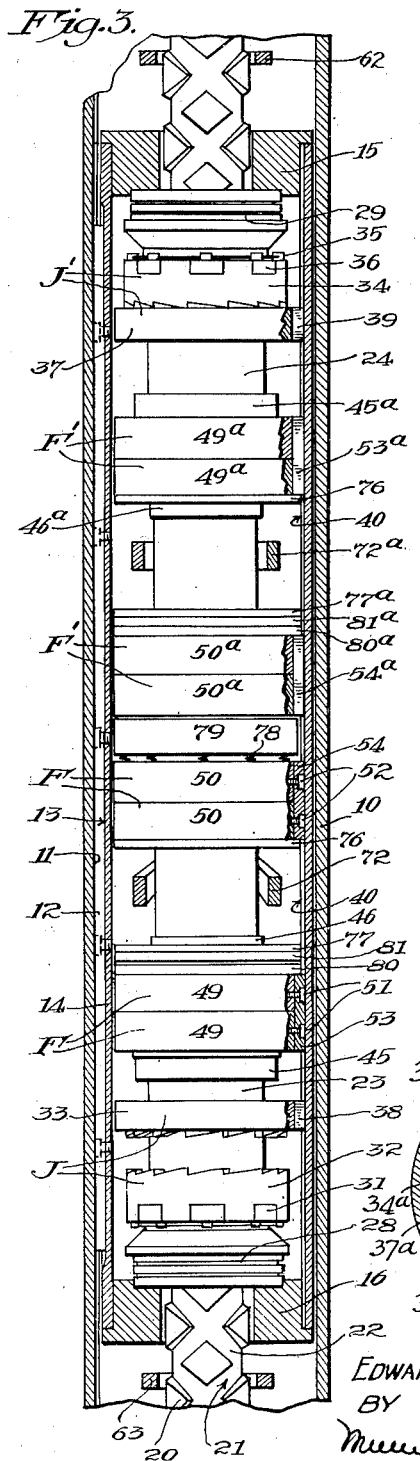
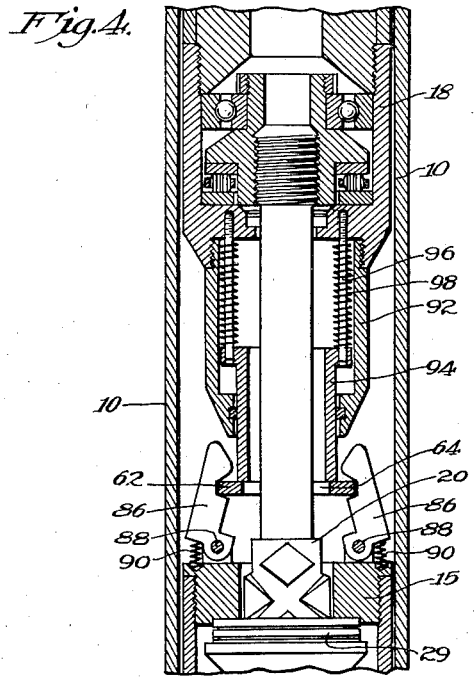
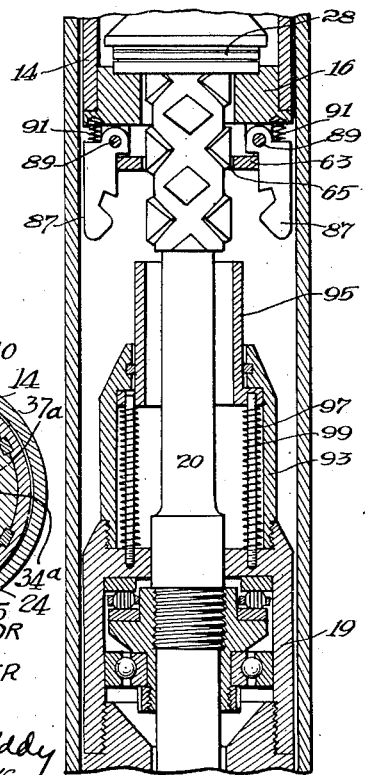
INVENTOR
EDWARD C. EKSTROMER
BY
Munn, Anderson & Liddy
ATTORNEYS July 12, 1938.  E. C. EKSTROMER  2,123,184
DRIVING MECHANISM
Filed May 11, 1937  3 Sheets—Sheet 3
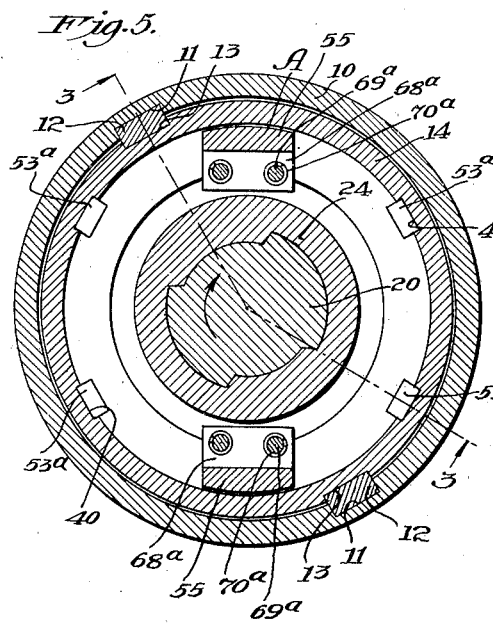
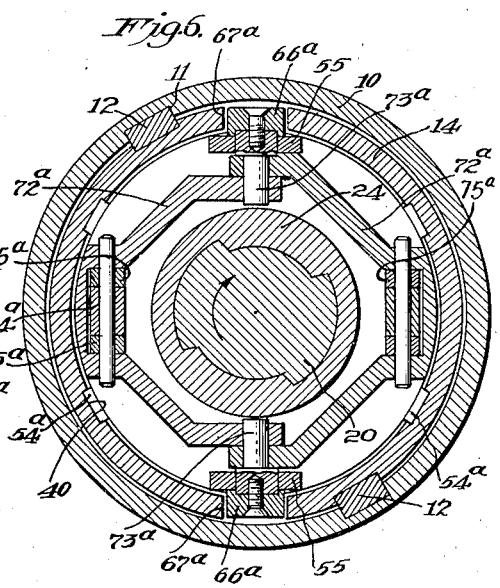
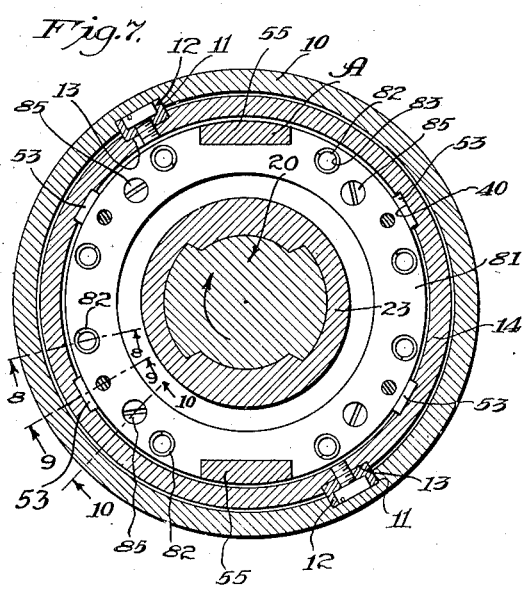
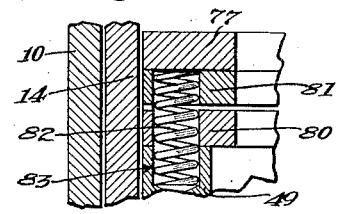
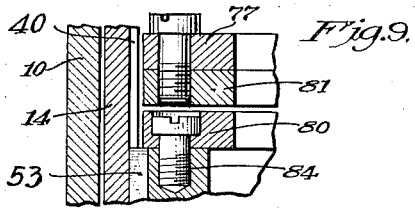
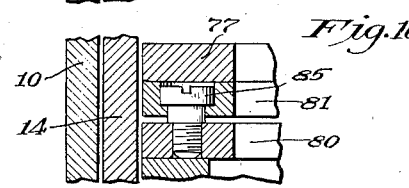
INVENTOR
EDWARD C. EKSTROMER
BY
Munn, Anderson & Liddy
ATTORNEYS Patented July 12, 1938

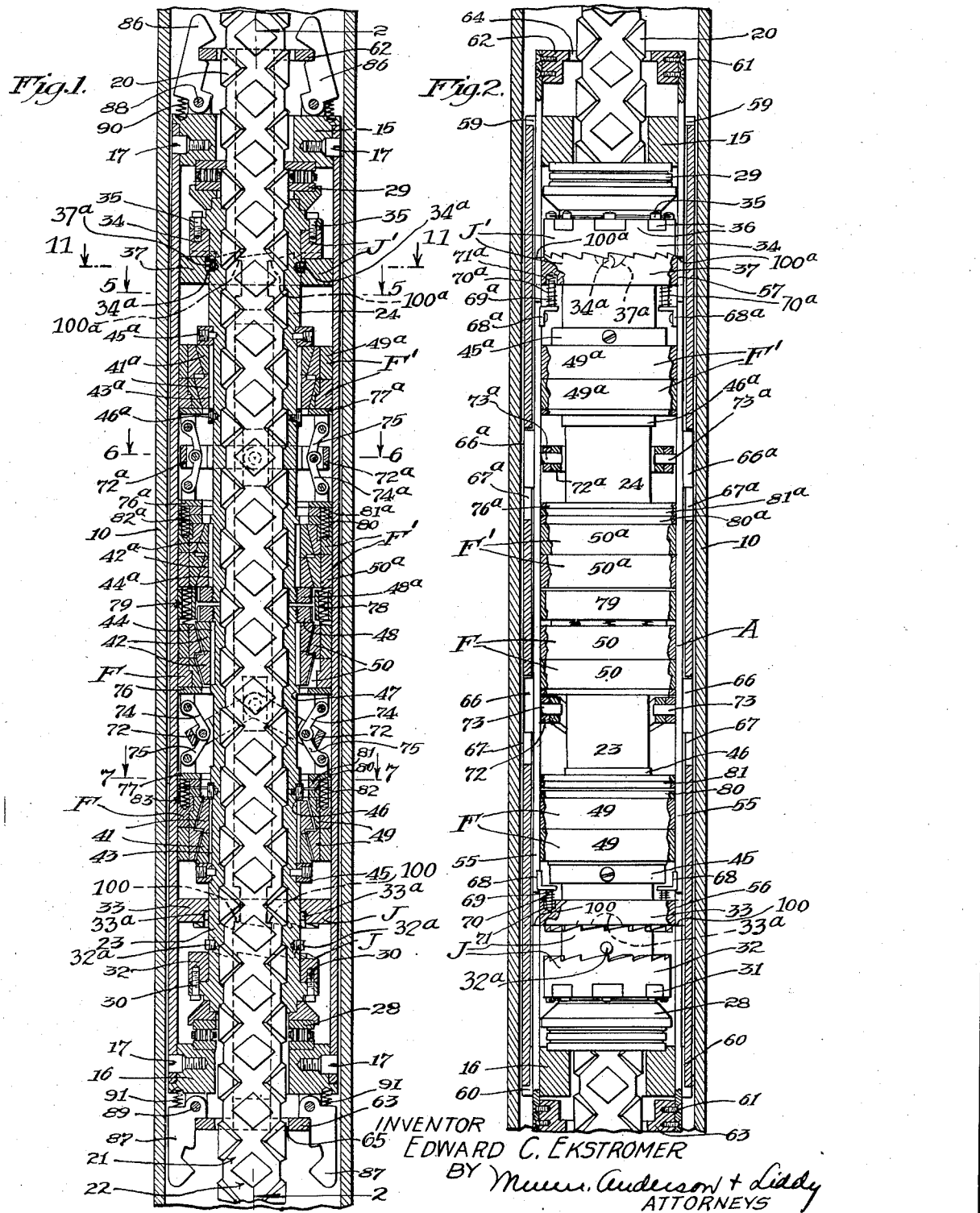

2,123,184

UNITED STATES PATENT OFFICE 2,123,184

DRIVING MECHANISM

Edward C. Ekstromer, Los Gatos, Calif., assignor to Electrolift Corporation, Reno, Nev., a corporation of Nevada Application May 11, 1937, Serial No. 141,955

18 Claims. (Cl. 74—57)

This invention relates to driving mechanisms and more particularly to motion converting mechanisms of the character embodied in my co-pending application for patent, Serial No. 95,556, filed August 12, 1936, wherein rotary motion is converted into reciprocating movement by mechanism embodying positive driving connections such as jaw clutches adapted to be alternately engaged and disengaged to cause one or another of a plurality of rotary driven members to co-act with a rotary driving member in actuating a shuttle or other reciprocable member.

An object of the present invention is to provide a motion converting mechanism embodying means by which engagement of the jaw clutches is caused to be effected when the jaws of the clutches are relatively at rest rotatively, so as to obviate excessive wear on the teeth of the clutch jaws and sudden stopping of the respective driven member, with the attendant shocks imposed thereon and on associated working parts.

Another object of this invention is to provide a motion converting mechanism wherein frictional braking connections, such as friction brakes, are co-ordinated with the positive driving connections provided by the jaw clutches, in a manner to smoothly absorb the starting load upon reversal of the shuttle's movement, by causing the jaws of the respective jaw clutch to be brought relatively to rest rotatively, prior to engagement of the jaws, so that such engagement will be smoothly effected and the shuttle then positively actuated.

With these and other objects in view, the invention consists in the combinations and arrangements of elements as set forth in the following specification and particularly pointed out in the appended claims.

In the accompanying drawings,

Figure 1 is a view showing in central longitudinal section the driving mechanism embodying this invention;

Figure 2 is a view similar to Figure 1, and taken on the line 2—2 thereof;

Figure 3 is a longitudinal sectional view taken on the line 3—3 of Figure 5;

Figure 4 is a central longitudinal sectional view similar to Figure 1, but with the intermediate portion of the mechanism broken out and the terminal portions thereof illustrated in detail;

Figures 5, 6 and 7 are transverse sectional views taken, respectively, on the lines 5—5, 6—6 and 7—7 of Figure 1;

Figures 8, 9 and 10 are fragmentary transverse sectional views taken respectively on the lines 8—8, 9—9 and 10—10 of Figure 7;

Figure 11 is a transverse sectional view taken on the line 11—11 of Figure 1.

Referring specifically to the drawings, the invention in its present embodiment is enclosed by and works in a tubular housing 10 which is similar to that disclosed in my co-pending application for patent on Pumping mechanism, Serial No. 82,025, filed May 27, 1936. For the present application it will suffice to state that this housing is cylindrical in cross section and is provided internally at diametrically opposed points with longitudinally extending grooves 11—11 in which work keys 12—12 (Figures 3 and 5) secured in longitudinal grooves 13—13 formed externally in a cylindrical shuttle 14, the ends of which are closed by top and bottom plug caps 15 and 16 respectively, rigidly secured to the shuttle by screws 17.

The shuttle 14 is confined by the keys 12—12 to movement axially in the housing, and is adapted to be reciprocated therein between upper and lower bearings 18 and 19, respectively, within which is journaled to extend through the shuttle in co-axial relationship thereto a feed shaft 20 having externally thereof right and left hand spiral grooves 21 and 22, respectively. The bearings 18 and 19 provide for both radial and end thrusts upon the shaft 20; and the boxes of these bearings are rigidly secured to other units (not shown) of the assembly making up the pumping mechanism of my co-pending application above referred to, all to the end that the bearing boxes will be fixed in the housing against rotation and axial displacement relative thereto and will confine the feed shaft 20 to rotational movement in the housing.

The shaft 20 broadly constitutes a driving member and has threadedly mounted thereon driven members in the form of sleeves which constitute right and left hand nuts 23 and 24, respectively.

The nuts 23 and 24 are in close proximity at their confronting ends, and respectively coact at their other ends with anti-friction thrust bearings 28 and 29 which respectively abut the top and bottom caps 15 and 16, whereby to confine the nuts against axial displacement relative to the shuttle.

Secured by screws 30 to interfitting flanges 31 on the nut 23 is a fixed clutch jaw 32 with respect to which a movable clutch jaw 33 is adapted to be engaged and disengaged, this movable jaw being slidably mounted on the cylindrical periphery of the nut 23 for movement axially relative to the fixed jaw 32. Another fixed clutch jaw 34 is secured by screws 35 to interfitting flanges 36 on the nut 24, for co-action with a movable clutch jaw 37, which latter jaw is freely mounted on the cylindrical periphery of the nut 24 for movement axially relative to such fixed jaw. Adjacent their respective fixed jaws 32 and 34, the nuts 23 and 24 are respectively provided with diametrically opposed stop pins 32a—32a and 34a—34a, each of which is located directly opposite the crest of a tooth on the jaw. These stop pins are adapted to co-act with axially arcuate recesses 33a and 37a centered with respect to the crests of teeth of the movable jaws 33 and 37, respectively, in a manner to be described in the operation of the invention.

It is to be noted from a consideration of Figure 3 that the co-acting teeth of the jaws 32 and 33 are adapted for driving engagement in one direction, whereas the co-acting teeth of the jaws 34 and 37 are adapted for driving engagement in the reverse direction. Furthermore, as shown in Figure 3, the movable jaws 34 and 37 are confined against rotation relative to the shuttle 14, yet are adjustable axially thereof by keys 38 and 39 fixed to the respective jaws and working in keyways 40 in the shuttle.

The fixed and movable jaws 32 and 33 constitute a jaw clutch J, whereas the fixed and movable jaws 34 and 37 constitute a jaw clutch J', the clutch J being adapted for positive driving engagement and the clutch J' for disengagement or vice versa, to accordingly render the nut 23 co-operable with the shaft 20 when rotated in one direction, to feed the shuttle 14 in one direction, or the nut 24 co-operable with the shaft to feed the shuttle in the reverse direction.

Fixed male cone rings 41—41 and 42—42 are mounted oppositely in pairs spaced from each other on the nut 23 and are fixed thereto by keys 43 and 44 respectively. The rings 41 are confined against axial displacement relative to the nut 23 by split stop rings 45 and 46 secured to the nut, and the rings 42 are confined against similar displacement by an annular shoulder 47 on the nut, and a ring 48 threaded on the end of the nut, all as clearly shown in Figure 1.

Co-acting respectively with the parts of fixed male cone-rings 41 and 42 are movable female cone rings 49—49 and 50—50, respectively, secured together to form unitary structures by screws 51—52 and keys 53 and 54, which latter work in the keyways 40 so as to confine the female cone rings against rotation relative to the shuttle 14, yet permit axial adjustment of the rings.

The pairs of male cone rings 41 and 42 co-act with the respective pairs of female cone rings 49 and 50 to provide friction brakes F—F, and it is to be noted that identical friction brakes F"—F" are identically associated with the nut 24 so that a detail description thereof is deemed unnecessary. However, to distinguish like parts of the brakes F and F' from each other, the numerals designating the parts of the brakes F" are provided with exponents.

For actuating the movable members of the brakes F, F' and clutches J and J' in a predetermined timed and functional relationship to each other, an actuating mechanism A is provided, and comprises a pair of diametrically opposed actuating rods 55—55 in the shuttle 14, which extend freely through grooves 56 and 57 in the movable jaws 33 and 37, respectively, and through grooves 58 and 58a in the female cone rings 49—50 and 49a—50a respectively. The end portions of the rods 55 extend freely through grooves 59 and 60 in the caps 15 and 16, respectively, and are rigidly connected at their ends by screws 61 to cross plates 62 and 63 respectively, above and below the caps 15 and 16. The cross plates have central openings 64 and 65 respectively, freely receiving the feed shaft 20.

The rods 55 are provided with keeper plates 66—66a which work in slots 67—67a in the shuttle 14 so as to guide the rods rectilinearly, and are also provided with inwardly projecting brackets 68—68a provided respectively with pins 69—69a surrounded by coil springs 70—70a projecting into pockets 71—71a in the respective movable jaws 33 and 37, the relationships of the brackets, pins, springs and movable jaws being clearly shown in Figure 2.

The movable members of the friction brakes F and F' are operatively connected to the aforestated actuating mechanism A by toggle mechanisms which are identical in construction so that a detailed description of one will suffice for both. However, to distinguish like parts of the two toggle mechanisms from each other, the numerals designating the parts of one mechanism are provided with exponents.

The toggle mechanism for the brakes F—F is interposed therebetween as shown in Figure 1, and comprises yoke links 72—72 pivotally mounted at one end on pins 73—73 projecting from the actuating rods 55. At their other ends the links 72—72 are pivotally connected to toggle links 74—74 and 75—75.

The toggle links 74 and 75 are respectively connected pivotally to toggle rings 76—77, the ring 76 directly engaging one of the movable female cone rings 50 and being opposed by coil springs 78 carried by a separator ring 79, these springs and separator ring being common to the movable brake rings 50 and 50a and tending to disengage them from the respective fixed male cone rings 42 and 42a.

Interposed between the toggle ring 77 and the confronting movable female cone ring 49 are compensating rings 80 and 81 carrying compensating springs 82 which bear against the toggle ring 77 and seat in pockets 83 in said one of the female cone rings 49.

The compensating ring 80 is secured to the female cone ring 49 by screws 84, whereas the compensating ring 81 is connected to the compensating ring 80 by screws 85 allowing a limited axial movement between the rings for stressing of the springs 82 which yieldingly apply the force of the toggle mechanism to the movable female cone rings 49 until the compensating rings abut. The toggle rings 76 and 77 and the compensating rings 80 and 81 are provided with suitable grooves for the free passage of the rods 55.

The clutch and brake actuating mechanism A formed by the assembly of the rods 55 and cross plates 62 and 63 operatively associated with the movable members of the brakes F, F' and clutches J, J', as above described, is adapted to be latched in one extreme position or another, axially with respect to the shuttle 14 to retain either the brake F and clutch J engaged and the brake F' and clutch J' disengaged or vice versa, by latch dogs 86 and 87 respectively, pivoted at 88 and 89 on the top and bottom caps 15 and 16, respectively, the dogs 86 and 87 being urged to latching positions by springs 90 and 91, for latching engagement respectively with the cross plates 62 and 63.

The dogs 86 and 87 are adapted to be moved to non-latching or released positions relative to the cross plates 62 and 63 respectively, according as the shuttle 14 reaches one extreme position or another in the housing 10. For this purpose, conical ended collars 92 and 93 are fixed, respectively, to the boxes of the bearings 18 and 19 in the path of movement of the dogs as shown in Figure 8. Sleeves 94 and 95 are slidably mounted in the collars 92 and 93 on rods 96 and 97 having springs 98 and 99 thereon for urging the respective sleeve to an advanced position for engagement and retraction against the action of the respective springs, by the respective cross plate 62 or 63 as the shuttle approaches the corresponding extreme position and before the respective latches are released. The springs 98 or 99, as the case may be, are thus placed under load, and the energy thus stored in the springs is utilized upon release of the respective latches, to move the actuating mechanism A from one of its extreme positions in order to reverse the engagement and disengagement of the clutch J, brake F and clutch J', brake F' for the purpose of effecting reverse movement of the shuttle.

The operation of the invention is as follows:

With the shuttle occupying its lowermost extreme position shown in Figures 1, 2, 3 and 4, the friction brakes F—F and the jaw clutch J are disengaged, and the friction brakes F'—F' are maintained engaged by the latches 86—86 which are coacting with the cross plate 62 to releasably retain the actuating mechanism A in its uppermost extreme position relative to the shuttle, the jaw clutch J' being maintained engaged by the springs 70a in which sufficient energy was stored during the preceding stroke for this purpose.

As the left hand nut 24 is now being positively held by the clutch J' against rotation, and as the feed shaft 20 is assumed to be driven by a rotary prime mover (not shown) in a clockwise direction as viewed in top plan, this nut will co-act with the left hand threads 22 of the shaft in moving the shuttle 14 upwardly in the housing 10.

As the shuttle approaches the upper extreme position, the cross plate 62 engages and retracts the sleeve 94 against the action of the springs 98, so as to place the latter under load and store energy therein. Continued upward movement of the shuttle causes the dogs 86 to engage the collar 92 and be moved thereby against the springs 90 to their released positions relative to the cross plate 62. The springs 98 are now free to shift the actuating mechanism A towards its lowermost extreme position relative to the shuttle, and during the initial portion of this movement of the actuating mechanism the toggle mechanism for the friction brakes F'—F' is released to disengage these brakes simultaneously with disengagement of the jaw clutch J', which is positively effected by lateral shoulders 100a on the rods 55 engaging the movable jaws 37.

At this point in the downward movement of the actuating mechanism, the toggle mechanism for the friction brakes F—F is actuated to initiate engagement of these brakes, and, upon further travel of the rods 55, the movable jaw 33 engages the stop pins 32a—32a on the nut 23 and is thus temporarily prevented from meshing with the rotating jaw 32 on the nut 23.

However, the rods 55 complete their full downstroke by compressing the springs 70, thereby placing the latter under load to store energy therein, and also causing the cross plate 63 to engage and retract the sleeve 95 against the action of the springs 99 so as to place the latter under load and store energy thereby, following which the cross plate 63 co-acts with the dogs 87 to latch the actuating mechanism A in its lowermost extreme position with the friction brakes F—F fully engaged, and the jaw clutch J still disengaged.

This mode of operation imposes a braking action upon the yet idling nut 23 by the friction brakes F—F, which very materially reduces the idling speed of the nut, it being understood that the brakes F—F slip to bring the nut nearly to rest. Concurrently, the stop pins 32a—32a become alined with the recesses 33a—33a in the movable jaw 33, so that under the previously stored energy in the springs 70, the jaw 33 co-acts with the jaw 32 to engage the jaw clutch J as the stop pins 32a are received in the recesses 33a. The energy of the springs 70 is only partially released when this occurs, and there is sufficient energy remaining in these springs to maintain the movable jaw 33 engaged with the fixed jaw 32. There is negligible or no shock upon reversal of the movement of the shuttle and the transfer of the load. The right hand nut 23 will now be positively held against rotation, whereas the left hand nut 24 will be free to idle by rotating with the shaft 20 in the aforestated clockwise direction. Therefore, the nut 23 will co-act with the right hand threads 21 of the shaft to positively move the shuttle downwardly in the housing.

As the shuttle approaches its lower extreme position, the cross plate 63 engages and retracts the sleeve 95 against the action of the springs 99 so as to place the latter under load and store energy therein. Continued downward movement of the shuttle causes the dogs 87 to engage the collar 93 and be moved thereby against the springs 91 to their released positions relative to the cross plate 63. The springs 99 are now free to shift the actuating mechanism A towards its uppermost extreme position relative to the shuttle so as to disengage the brakes F—F and clutch J, and then successively engage the brakes F'—F' and clutch J' by the functioning of the stop pins 34a and the springs 70a in the same manner as the stop pins 32a and springs 70 during the downward movement of the actuating mechanism A.

The shuttle will now be moved upwardly to complete the cycle of operation which is repeated so long as the shaft 20 is being rotated. It will thus be evident that the rotary motion of the shaft 20 will be converted into reciprocating motion at the shuttle so that with a reciprocating member such as the plunger rod of a pump (not shown) operatively associated with the shuttle, such element will be correspondingly reciprocated to perform useful work.

It will be manifest that by the provision of the friction brakes F and F' that the rotating idle nut 23 or 24 as the case may be will be smoothly brought nearly to rest, following which the respective jaw clutch J or J' will be engaged to carry the load and positively drive the shuttle. The friction brakes eliminate the necessity of engaging the jaw clutch while the nut carrying the fixed jaw of the clutch is rotating idly with the shaft 20, thus obviating excessive wear on the jaw clutch teeth and insuring that the reversal of the shuttle's movement will be accomplished smoothly and positively. Furthermore, the wear and tear on associated parts of the mechanism is reduced to a minimum as a result of this manner of reversing the movement of the shuttle and the positive driving thereof without imposing sudden shocks thereon, the starting load at each reversal of the shuttle's movement being practically absorbed by the friction brakes in their functional relationship to the respective jaw clutch.

I claim:

1. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members when held against rotation are adapted to be axially fed in opposite directions by the driving member; means for alternately holding the driven members against rotation by establishing a positive driving connection between the respective driven member and the shuttle, whereby to reciprocate the latter; and means for gradually absorbing the starting load at each reversal of the shuttle, by substantially arresting rotation of the idle driven member before said holding means is rendered active.

2. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members, when held against rotation, are adapted to be axially fed in opposite directions by the driving member; means for alternately holding the driven members against rotation by establishing a positive driving connection between the respective driven member and the shuttle, whereby to reciprocate the latter; and friction brake means co-actable with the shuttle and idly rotating driven member at each reversal of the shuttle, to bring said driven member substantially to rest prior to establishing the positive driving connection between said driven member and shuttle.

3. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members, when held against rotation, are adapted to be axially fed in opposite directions by the driving member; jaw clutches co-actable with the shuttle and rotary driven members; friction brakes co-actable with the shuttle and rotary driven members; and actuating means operatively connected to said clutches and brakes to disengage the jaw clutch and the friction brake for one rotary driven member and successively engage the friction brake and jaw clutch for the other rotary driven member or vice versa, whereby to reciprocate the shuttle and cause the starting load at each reversal of the shuttle to be gradually absorbed by the respective friction brake, and the shuttle then positively actuated by the respective jaw clutch.

4. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members, when held against rotation, are adapted to be axially fed in opposite directions by the braking member; frictional braking connections one for each of said rotary driven members and each having a fixed part carried by the respective rotary driven member, and a movable part carried by the shuttle and confined to movement axially thereof to engage and disengage the fixed part; positive driving connections one for each of said rotary driven members and each having a fixed part carried by the respective rotary driven member and a movable part carried by the shuttle and confined to movement axially thereof to engage and disengage the fixed part; and actuating means operatively associated with said movable parts of the frictional braking and positive driving connections to successively engage the parts thereof for one rotary driving member and to disengage the parts for the other rotary driving member or vice versa, whereby to reciprocate the shuttle and cause the starting load at each reversal of the shuttle's movement to be frictionally absorbed by the respective frictional braking connection and the shuttle then positively actuated by the respective positive driving connection.

5. Motion converting mechanism comprising a shuttle; a rotary driving member; a plurality of rotary driven members, co-operating with the driving member; and mechanism co-acting with the driven members and shuttle to effect reciprocation of the latter in response to rotation of the driving member in one direction; said mechanism including means for frictionally braking movement of the shuttle at each reversal thereof in order to gradually absorb the starting load; and means for positively actuating the shuttle during the remainder of each stroke thereof.

6. Motion converting mechanism comprising a shuttle; a rotary driving member; a plurality of rotary driven members co-operating with the driving member; and mechanism co-acting with the driven members and shuttle to effect reciprocation of the latter in response to rotation of the driving member in one direction, said mechanism including friction brakes one for each driven member, for braking movement of the shuttle at each reversal thereof; and jaw clutches, one for each driven member, correlated with the respective friction brake to positively drive the shuttle following braking thereof by said brakes.

7. Motion converting mechanism comprising a shuttle; a rotary driving member; a plurality of rotary driven members, co-operating with the driving member; and mechanism co-acting with the driven members and shuttle to effect reciprocation of the latter in response to rotation of the driving member in one direction; said mechanism including friction brakes and jaw clutches for each driven member; and actuating means operatively connected to said brakes and clutches to disengage the brakes and clutches for one driven member and successively engage the friction brakes and jaw clutches for the other driven member or vice versa.

8. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members when held against rotation are adapted to be axially fed in opposite directions by the driving member; jaw clutches co-actable with the shuttle and rotary driven members; friction brakes co-actable with the shuttle and rotary driven members; actuating means for said clutches and brakes having axially yieldable operative connections to said jaw clutches and toggle connections to said friction brakes, and means for operating said actuating means to disengage the jaw clutch and the friction brake for one rotary driven member and successively engage the friction brake and jaw clutch for the other rotary member or vice versa.

9. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members, when held against rotation, are adapted to be axially fed in opposite directions by the driving member; jaw clutches co-actable with the shuttle and rotary driven members; friction brakes co-actable with the shuttle and rotary driven members; actuating means operatively connected to said clutches and brakes to disengage the jaw clutch and the friction brake for one driven member and successively engage the friction brake and jaw clutch for the other driven member or vice versa; means for latching the actuating means in one position or another; means for storing energy to move the actuating means from one of its positions to the other or vice versa according as the shuttle approaches one predetermined extreme position or the other; and means for releasing the latching means following the storing of energy as aforestated in order that said actuating means will be moved to actuate the clutches and brakes.

10. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members, when held against rotation, are adapted to be axially fed in opposite directions by the driving member; jaw clutches co-actable with the shuttle and rotary driven members; friction brakes co-actable with the shuttle and rotary driven members; actuating means operatively connected to said clutches and brakes to disengage the jaw clutch and the friction brake for one driven member and successively engage the friction brake and jaw clutch for the other driven member or vice versa; means for latching the actuating means in one position or another; means for storing energy to move the actuating means from one of its positions to the other or vice versa according as the shuttle approaches one predetermined extreme position or the other; means for releasing the latching means following the storing of energy as aforestated in order that said actuating means will be moved to actuate the clutches and brakes; means providing a yieldable operative connection axially between said actuating means and jaw clutches; and means for maintaining the jaw clutches disengaged until the respective friction brake is fully engaged, and causing the last means to store energy operating to engage the respective jaw clutch.

11. Motion converting mechanism comprising a shuttle; a rotary feed shaft having right and left hand threads; right and left hand threaded nuts on the feed shaft; means operatively connecting the nuts with the shuttle for movement therewith yet rendering the nuts free to rotate idly with the feed shaft; jaw clutches for operatively connecting the nuts to the shuttle; friction brakes for operatively connecting the nuts to the shuttle; and actuating means operatively connected to said clutches and brakes to disengage the friction brakes and jaw clutches for one nut and successively engage the friction brakes and jaw clutches for the other nut or vice versa to alternately hold one nut or the other against rotation for co-action with the feed shaft in reciprocating the shuttle.

12. Motion converting mechanism comprising a shuttle; a rotary feed shaft having right and left hand threads; right and left hand threaded nuts on the feed shaft; means operatively connecting the nuts with the shuttle for movement therewith yet rendering the nuts free to rotate idly with the feed shaft; jaw clutches for operatively connecting the nuts to the shuttle; friction brakes for operatively connecting the nuts to the shuttle; actuating means for said clutches and brakes having axially yieldable operative connections to said jaw clutches, and toggle connections to said friction brakes; and means for operating said actuating means to disengage the friction brakes and jaw clutches for one nut and successively engage the friction brakes and jaw clutches for the other nut or vice versa, whereby to hold one nut or the other against rotation and thereby reciprocate the shuttle.

13. Motion converting mechanism comprising a shuttle; a rotary driving member; and mechanism co-acting with said member to reciprocate the latter in response to rotation of the member in one direction; said mechanism including means for frictionally absorbing the starting load at each reversal of the shuttle; and means correlated with the first means to positively drive the shuttle following said action of the last means.

14. Motion converting mechanism comprising a shuttle; a rotary driving member; and mechanism co-acting with said member to reciprocate the latter in response to rotation of the member in one direction; said mechanism including friction brake means for smoothly braking the shuttle by gradually absorbing the starting load; and jaw clutch means correlated with said friction brake means to positively actuate the shuttle following said action of the friction brake means.

15. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members, when held against rotation, are adapted to be axially fed in opposite directions by the driving member; jaw clutches co-actable with the shuttle and rotary driven members; friction brakes co-actable with the shuttle and rotary driven members; actuating means operatively connected to said clutches and brakes to disengage the jaw clutch and the friction brake for one driven member and successively engage the friction brake and jaw clutch for the other driven member or vice versa; means for latching the actuating means in one position or another; means for storing energy to move the actuating means from one of its positions to the other or vice versa according as the shuttle approaches one predetermined extreme position or the other; means for releasing the latching means following the storing of energy as aforestated in order that said actuating means will be moved to actuate the clutches and brakes; means providing a yieldable operative connection axially between said actuating means and jaw clutches; each of said jaw clutches including a fixed jaw carried by one of the rotary driven members, and a movable jaw yieldably connected operatively to the actuating mechanism by the last means; the rotary driven members and the respective movable jaws having stop pins and recesses co-acting upon full engagement of the friction brakes, to release energy stored by the last means, so as to engage the respective jaw clutch.

16. Motion converting mechanism comprising a shuttle; a rotary driving member; a plurality of rotary driven members co-operating with the driving member; mechanism co-acting with the driven members and shuttle to effect reciprocation of the latter in response to rotation of the driving member in one direction, said mechanism including friction brakes one for each driven member, for braking movement of the shuttle prior to each reversal thereof; jaw clutches, one for each driven member, correlated with the respective friction brake to positively drive the shuttle following braking action of the friction brake and means for preventing engagement of the jaw clutches until the respective friction brake is fully engaged, and brings the idly rotating driven member substantially to rest, whereby to smoothly reverse the movement of the shuttle.

17. Motion converting mechanism comprising a shuttle; a rotary driving member; a plurality of rotary driven members, co-operating with the driving member; and mechanism co-acting with the driven members and shuttle to effect reciprocation of the latter in response to rotation of the driving member in one direction; said mechanism including friction brakes and jaw clutches for each driven member; and means co-acting with the actuating means and jaw clutches to prevent engagement of the latter until the respective friction brake is fully engaged and brings the idly rotating driven member substantially to rest, whereby to smoothly reverse the movement of the shuttle.

18. Motion converting mechanism comprising a shuttle; a rotary driving member adapted to be rotated in one direction; a plurality of rotary driven members; means operatively connecting said driven members to the shuttle for movement axially therewith yet rendering the driven members free to rotate idly with the driving member; means by which the driven members when held against rotation are adapted to be axially fed in opposite directions by the driving member; jaw clutches co-actable with the shuttle and rotary driven members to hold the latter against rotation; friction brakes co-actable with the shuttle and rotary driven members to bring the latter substantially to rest; actuating means for said clutches; means for operating said actuating means to disengage the jaw clutch and friction brake for one rotary driven member and successively engage the friction brake and jaw clutch for the other rotary driven member or vice versa; and means co-acting with the actuating means and jaw clutches, to prevent engagement of the latter until the respective friction brake has brought the idly rotating driven member substantially to rest, whereby to smoothly reverse the movement of the shuttle.

EDWARD C. EKSTROMER.